US006436478B2

(12) United States Patent
O'Neil

(10) Patent No.: US 6,436,478 B2
(45) Date of Patent: *Aug. 20, 2002

(54) PROCESS FOR COATING THERMOPLASTIC SUBSTRATES WITH A COATING COMPOSITION CONTAINING A NON-AGGRESSIVE SOLVENT

(75) Inventor: James William O'Neil, Chadds Ford, PA (US)

(73) Assignee: E. I. de Pont de Nemours & Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/753,880

(22) Filed: Jan. 3, 2001

Related U.S. Application Data

(62) Division of application No. 09/413,660, filed on Oct. 6, 1999, now Pat. No. 6,207,224.

(51) Int. Cl.$^7$ ................................................ B05D 3/02
(52) U.S. Cl. ................................................. 427/393.5
(58) Field of Search ........................... 427/385.5, 393.5

(56) References Cited

U.S. PATENT DOCUMENTS

| | | | |
|---|---|---|---|
| 3,923,701 A | 12/1975 | Rutherford et al. | 252/544 |
| 4,020,216 A | 4/1977 | Miller | |
| 4,107,228 A | 8/1978 | Horowitz et al. | 260/836 |
| 4,269,879 A | 5/1981 | Davis | 428/36 |
| 4,544,578 A | 10/1985 | Duane, Jr. | 427/140 |
| 4,732,787 A | 3/1988 | Vantillard et al. | 427/386 |
| 4,732,960 A | 3/1988 | Rasshofer et al. | 528/75 |
| 5,114,815 A | 5/1992 | Oda et al. | 430/58 |
| 5,288,520 A | 2/1994 | Toyoshima et al. | 427/322 |
| 5,326,812 A | 7/1994 | Diener et al. | 524/507 |
| 5,360,843 A | 11/1994 | Edgar et al. | 524/41 |
| 5,546,109 A | 8/1996 | Nakano | 347/93 |
| 5,548,019 A * | 8/1996 | Kawakami et al. | 524/591 |
| 5,654,037 A | 8/1997 | Moore et al. | 427/379 |
| 5,674,967 A | 10/1997 | Goodwin | 528/42 |
| 5,688,864 A | 11/1997 | Goodwin | 524/858 |
| 5,709,909 A | 1/1998 | Leibfarth et al. | 427/407.1 |
| 5,804,352 A * | 9/1998 | Cunningham et al. | 427/240 |
| 5,959,960 A * | 9/1999 | Collier et al. | 369/275.1 |

FOREIGN PATENT DOCUMENTS

| | | |
|---|---|---|
| DE | 63301 | 8/1968 |
| DE | 3029659 A | 3/1981 |
| DE | 3315691 A | 11/1983 |
| DE | 3507461 A | 9/1986 |
| DE | 3729068 A | 3/1989 |
| EP | 547504 | 6/1993 |
| EP | 721968 A1 | 7/1996 |
| EP | 0 721 968 A1 | 7/1996 |
| EP | 812891 A1 * | 12/1997 |
| GB | 2 100 271 A | 12/1982 |
| JP | 54081342 A | 6/1979 |
| JP | 60184597 A | 9/1985 |
| JP | 63051477 A | 3/1988 |
| JP | 63199771 A | 8/1988 |
| JP | 01056772 | 3/1989 |
| WO | WO 89/11497 | 11/1989 |
| WO | WO 9426827 A1 | 11/1994 |
| WO | WO 9612769 A1 | 5/1996 |
| WO | WO 97/33748 | 9/1997 |
| WO | WO 98/42774 | 10/1998 |

OTHER PUBLICATIONS

Donald J. Hart, Factors Affecting the Distinicition of Image (DOI) of Painted Fiberglass Reinforced Reaction Injection Molded (RRIM) Urethane, *J. Coat. Technol.*, 1982.
R. A. Ryntz, Painting of Plastics, *Federation Series on Coatings Technology*, 1994.
W. Schroeder, Polyurethanes World Congr. Proc., 1987.
Fernandex Moran, Paints Their Composition, Types of Pigments, Solvents and Additives, Priming, Thickness, Sizes and Finishes, *Journal; General Review*, 1990.
W. D. Schulz, Corrosion Protection by Zinc and aluminum Sprayed Coatings, *Journal*, 1984.
Riquet et al., Food and Packaging Interactions: Tailoring Fatty Fodd Simulants, *Food Addit. Contam*, 1997.
S. Cottier et al., Interaction of a Vinylic Organosol Used as Can Coating with Solvents and Food, *J. Agric. Food Chem.*, 1998.
P. Alexandridis et al., Polyethylene Oxide–Containing Amphiphilic Block Copolymers in Ternary Mixtures with Water and Organic Solvent: Effect of Copolymer and Solvent Type on Phase Behaviour and Structure, *Colloids & Surfaces*, 129/130, 1997.
A. Matsumoto et al., Solvent Effect in the Copolymerisation of Methyl Methacrylate with Oligoglycol Dimethacrylate, *Europ. Polym. J.*, 25, 1989.

(List continued on next page.)

Primary Examiner—Erma Cameron
(74) Attorney, Agent, or Firm—Sudhir G. Deshmukh

(57) ABSTRACT

A process for coating a thermoplastic substrate which comprises applying a solvent based coating composition to the substrate and curing the coating composition at ambient temperature to 125° C. to form a uniform smooth film on the substrate;
wherein the coating composition contains about 45–80% by weight of a film forming binder and 20–55% by weight of an organic liquid carrier; wherein the binder contains (A) 40–90% by weight, based on the weight of the binder, of a polymer selected from the following: acrylic polyol, polyester polyol, polyether polyol or a polyurethane polyol; and (B) 10–60% by weight, based on the weight of the binder, of an organic polyisocyanate crosslinking agent; and wherein the organic liquid carrier used in the coating composition comprises at least 50% by weight, based on the weight of the organic liquid carrier used in the coating composition, of tertiary butyl acetate; the process of this invention also can be used to apply lacquers, i.e., coating composition that do not contain a crosslinking agent such as a polyisocyanate.

6 Claims, No Drawings

OTHER PUBLICATIONS

A. H. Shturman, Surface Diffusion Colouring with Reinforcement of Polymer Products, *Plast. Massy 1988*, 1988.

G. D. Cheever, Analyses of Defects Occurring at Interfaces in Multilayer Paint Systems on Polymeric Substrates, *J. Coatings Tech.*, 58, 1986.

J. Nicolas, Some Solutions to the Problems of Painting Plastics, *Pinturas Acabadox*, 26, 1986.

D. J. Hart, Factors Affecting the Distinctionof Image (DOI) of Painted Fibre Glass–Reinforcement Reaction Injection Moulded (RRIM) Urethane, *J. Coatings Tech.*, 54, 1982.

H. Potente et al., Mechanical Properties of Coatings Amorphous Thermoplastic Materials, *Farbe Lack*, 86, 1980.

M. Risberg, Selecting Paints for Plastics, *Fin. Ind.*, 4, 1980.

M. Risberg, Painting of Homogeneous and Expanded Plastic Material, *Farq Fernissa*, 1977.

B. Lindberg, Painting of Plastics, II. Solvent Attack, Wetting and Plasticizer, *Farq Lack*, 23, 1977.

B. Lindberg, Painting Plastics, *Paper XIIIth FATIPEC Congress. Cannes*, 1976.

* cited by examiner

PROCESS FOR COATING THERMOPLASTIC SUBSTRATES WITH A COATING COMPOSITION CONTAINING A NON-AGGRESSIVE SOLVENT

CROSS REFERENCE TO RELATED APPLICATION

This application is a divisional of Application 09/413,660, filed Oct. 6, 1999 which was granted on Mar. 27, 2001 as U.S. Pat. No. 6,207,224.

BACKGROUND OF THE INVENTION

1. Field of the Invention

This invention is directed to a process for coating thermoplastic substrates with a coating composition that contains a non-aggressive solvent that does not attack the substrates and the process provides a finish that is smooth, even and free of defects and covers defects in the substrate.

2. Description of the Prior Art

Thermoplastic parts of ABS (acrylonitrile/butadiene/styrene), polyethylene, polypropylene, chlorinated polyolefins, polycarbonates, polyvinyl chloride and the like are widely used in automobiles and trucks and particularly in the interior of automobiles and trucks. Conventional coating compositions contain solvents such as toluene, xylene, ethyl acetate, butyl acetate, methyl ethyl ketone, propylene glycol monomethyl ether acetate and the like, which attack the surface of such thermoplastic parts. These conventional coating compositions when cured will telegraph any defects in the thermoplastic part or substrate. To hide such defects, a sealer is first applied and at least partially dried before a topcoat is applied. Another techniques that is used is to apply a layer of a conventional solvent based coating composition, allow it to cure, scuff or sand the resulting coating and then apply a second coating which usually hides the defects of the thermoplastic substrate.

Water borne coating compositions can be used which will not attack the thermoplastic substrate and when cured will not telegraph the defects of the plastic substrate through the coating as occurs with solvent based coating compositions in which the solvent attacks the plastic substrate. Typically, waterborne coatings do not provide the same high level of performance as do solvent based coatings.

It would be very desirable to utilize a solvent based coating composition to coat, thermoplastic substrates that cures at ambient or relatively low temperatures in which the solvent of the composition will not attack the thermoplastic substrate and still be an excellent solvent for the coating composition and preferably not a regulated solvent which contributes towards air pollution problems.

SUMMARY OF THE INVENTION

A process for coating a thermoplastic substrate which comprises applying a solvent based coating composition to the substrate and curing the coating composition at ambient temperature to 125° C. to form a uniform smooth film on the substrate; wherein the coating composition contains about 45–80% by weight of a film forming binder and 20–55% by weight of an organic liquid carrier; wherein the binder contains (A) 40–90% by weight, based on the weight of the binder, of a polymer selected from the following: acrylic polyol, polyester polyol, polyether polyol or a polyurethane polyol; and (B) 10–60% by weight, based on the weight of the binder, of an organic polyisocyanate crosslinking agent; and wherein the organic liquid carrier used in the coating composition comprises at least 50% by weight, based on the weight of the organic liquid carrier used in the coating composition, of tertiary butyl acetate.

The process of this invention also can be used to apply lacquers, i.e., coating composition that do not contain a crosslinking agent such as a polyisocyanate.

DETAILED DESCRIPTION OF THE INVENTION

The process of this invention provides for the use of a solvent based coating composition to coat plastic substrates that cures at ambient temperatures and does not attack the substrate and hides certain defects in the substrates. The coating composition contains at least 50% by weight, based on the total weight of organic liquid carrier used in the composition, of tertiary butyl acetate and up to 50% by weight of a compatible organic solvent. Preferably, the composition contains 75–90% by weight of tertiary butyl acetate and 10–25% by weight of other compatible organic solvents. The composition contains 45–80% by weight, based on the total weight of the composition, of film forming binder and correspondingly 20–55% by weight of organic liquid carrier. The film forming binder is composed of 40–90% by weight, based on the weight of the binder, of an acrylic polyol, a polyester polyol, a polyether polyol or a polyurethane polyol and 10–60% by weight of an organic polyisocyanate crosslinking agent.

Typical plastic substrates that are used to make a wide variety of parts that can be coated by the process of this invention are polyolefins such as polyethylene, polypropylene, chlorinated polyolefins; polycarbonates, polyvinyl chloride, polyvinylidene chloride, polyvinyl fluoride, polyesters such as polybutylene terephthalate, polyethylene terephthalate, polyethylene terephthalate/polybutylene terephthalate blends, acrylic polymers such as poly(ethylene/methyl acrylate/glycidyl methacrylate), poly (ethylene/butyl acrylate/glycidyl methacrylate), ABS, blends of polymers like polycarbonate/ABS, reinforced polymers like polypropylene/glass fibers, polycarbonate/glass fibers, polyamide/glass fibers and thermoplastic elastomers like polyester elastomers.

The principal solvent used in the organic liquid carrier of the coating composition that will not attack these plastic substrates and help the coating composition hide a variety of surface defects, such as splay, in the substrate is tertiary butyl acetate. T-butyl acetate can readily be incorporated into isocyanate containing coating compositions and will not react with the isocyanate constituents of the coating. Also, it is a good solvent for most polymers such as acrylics, polyesters, polyethers, polyurethanes and is compatible with many solvents and other constituents that are typically used in coating compositions. In particular, t-butyl acetate is readily volatilized at ambient temperatures and above and coatings formulated therewith dry rapidly. Up to 50% by weight of other compatible solvents can be used such as glycol ethers such as n-propoxy propanol, alcohols such as methanol, ethanol, isopropanol, butanol, and high molecular weight esters such as 2-ethyl hexyl acetate. By compatible is meant solvents that will blend with tertiary butyl acetate and will be a solvent for the binder used in the coating composition.

The following is a list of aggressive solvents that can not be used since these solvents attack one or more of the aforementioned plastic substrates or cause the coating formed on these substrates to allow the defects of the substrate to show through the resulting finish on the substrate: ketones such as methyl ethyl ketone, methyl isobutyl ketone, methyl amyl ketone, 1,4 pentanedione, low molecular weight esters such as ethyl acetate, hexyl acetate, and surprisingly the isomers of t-butyl acetate, i.e. n-butyl acetate secondary butyl acetate and isobutyl acetate; and aromatic hydrocarbons such as toluene and xylene. Depending on the plastic substrate and how it was manufactured under some circumstances up to 30% by weight, based on the weight of organic liquid carrier in the composition, of these aggressive solvents can be used but it is preferable not to use these solvents in the coating composition.

The coating composition used in the process of this invention primarily is used as a pigmented base coat or monocoat and contains solid color pigments or metallic flake pigments or mixtures thereof and is applied to a plastic substrate and if desired, then can be top coated or over coated with a clear coating composition. The coating composition can be applied as a pigmented monocoat. Also, the coating composition used in the process of this invention can be applied with conventional spray equipment or electrostatic spray equipment and cured at ambient temperatures and temperatures up to 125° C. to decrease drying time depending upon the plastic substrate used.

Under some circumstances, the process of this invention is used to apply a clear coat directly to the plastic substrate. For example, if the plastic substrate has the desired color, a clear coat is applied directly to the substrate and splay marks or defects in the substrate do not show through.

Acrylic polyols used in the coating composition that is used by the process of this invention are prepared by conventional polymerization techniques in which the monomers, solvent, and polymerization initiator are charged over a 1–24 hour period of time, preferably in a 2–8 hour time period, into a conventional polymerization reactor in which the constituents are heated to about 60–175° C., preferably about 140–170° C. The acrylic polyol has a weight average molecular weight of about 2,000–20,000, preferably about 5,000–10,000.

Molecular weight is determined by gel permeation chromatography using polystyrene as the standard.

Typical polymerization initiators that are used for forming the acrylic polyol are azo type initiators such as azo-bis-isobutyronitrile, 1,1'-azo-bis(cyanocyclohexane), peroxy acetates such as t-butyl peracetate, peroxides such as di-t-butyl peroxide, benzoates such as t-butyl perbenzoate, octoates such as t-butyl peroctoate and the like. Typical solvents that can be used in the process are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, esters, acetates and mixtures of any of the above.

Typical polymerizable monomers that are used to form the acrylic polyol are alkyl (meth)acrylates, meaning alkyl acrylates and alkyl methacrylates, having 1–18 carbon atoms in the alkyl group such as methyl methacrylate, ethyl acrylate, ethyl methacrylate, propyl acrylate, propyl methacrylate, isopropyl methacrylate, butyl acrylate, isobutyl methacrylate, butyl methacrylate, t-butyl methacrylate, pentyl acrylate, pentyl methacrylate, hexyl acrylate, hexyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate; other useful monomers are styrene, alpha methyl styrene or any mixtures of these monomers, and hydroxy alkyl (meth)acrylates meaning hydroxy alkyl acrylates and hydroxy alkyl methacrylates having 1–4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like. Other monomers that can be used are acrylamide, methacrylamide, acrylonitrile, hydroxy methacrylamide and the like.

To improve cleanability a fluoroalkyl containing monomers can be used in amounts of about 0.1–5.0% by weight, based on the weight of the acrylic polyol. Useful fluorocarbon monomers are represented by the formula

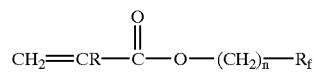

where R is hydrogen or an alkyl group having 1–2 carbon atoms, n is an integer of 1–18 and $R_f$ is a fluoroalkyl containing group having at least 4 carbon atoms and preferably a straight chain or branched chain fluoroalkyl group having 4–20 carbon atoms which optionally can contain an oxygen atom.

Typically useful fluoroalkyl containing monomers are perfluoro methyl ethyl methacrylate, perfluoro ethyl ethyl methacrylate, perfluoro butyl ethyl methacrylate, perfluoro pentyl ethyl methacrylate, perfluoro hexyl ethyl methacrylate, perfluoro octyl ethyl methacrylate, perfluoro decyl ethyl methacrylate, perfluoro lauryl ethyl methacrylate, perfluoro stearyl ethyl methacrylate, perfluoro methyl ethyl acrylate, perfluoro ethyl ethyl acrylate, perfluoro butyl ethyl acrylate, perfluoro pentyl ethyl acrylate, perfluoro hexyl ethyl acrylate, perfluoro octyl ethyl acrylate, perfluoro decyl ethyl acrylate, perfluoro lauryl ethyl acrylate, perfluoro stearyl ethyl acrylate, and the like. Preferred are perfluoro alkyl ethyl methacrylates wherein the perfluoroalkyl group contains 4–20 carbon atoms.

Other useful fluoroalkyl containing monomers are represented by the formula

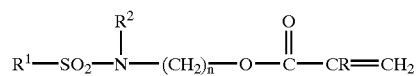

where

R is as defined above, $R^1$ is a fluoroalkyl group having 4–12 carbon atoms, $R^2$ is an alkyl group having 1–4 carbon atoms and n is an integer of 1–4.

Typical of these monomers are the following:

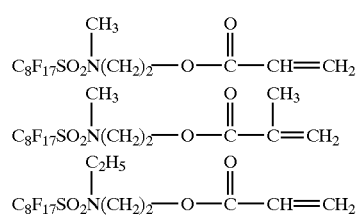

-continued

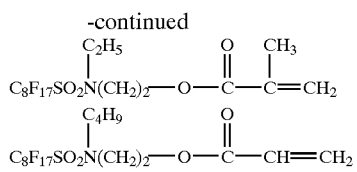

Preferred fluorinated acrylic polyols which form high quality coatings contain polymerized monomers of an alkyl methacrylate having 2–6 carbon atoms in the alkyl group, an alkyl acrylate having 2–8 carbon atoms in the alkyl group, a hydroxy alkyl acrylate having 2–4 carbon atoms in the alkyl group, styrene and perfluoroalkyl ethyl methacrylate having 4–20 carbon atoms in the alkyl group. One particularly preferred polymer contains butyl methacrylate, butyl acrylate, styrene, hydroxy propyl acrylate and the above perfluoroalkyl containing monomer.

Another preferred fluorinated acrylic polyol contains polymerized monomers of an alkyl methacrylate having 2–6 carbon atoms in the alkyl group, an alkyl acrylate having 2–8 carbon atoms in the alkyl group, styrene, an alkylene glycol methacrylate and a perfluoro alkyl ethyl methacrylate having 4–20 carbon atoms in the alkyl group. One particularly prefer-red polymer contains butyl methacrylate, butyl acrylate, hydroxy propyl acrylate, ethylene triglycol methacrylate and the above perfluoro alkyl ethyl methacrylate monomer.

Typical polyester polyols that can be used to form the coating composition used in the process of this invention are polyesters of dicarboxylic acids and a polyol. These polyesters are hydroxy functional, have a number average molecular weight of 200–10,000. Typical acids and anhydrides that can be used are aliphatic dicarboxylic acids such as maleic acid, maleic anhydride, adipic acid and sebacic acid and 1,12 dodecanoic acid; aromatic dicarboxylic acids and anhydrides such as phthalic acid, phthalic anhydride, isophthalic acid, terephthalic acid, cycloaliphatic dicarboxylic acids such as hexahydrophthalic acid and its anhydride. Typical polyols that can be used are 1,4 butane diol, 1,6 butane diol, ethylene glycol, trimethylolpropane, 1,4 cyclohexane dimethanol, caprolactone polyols and dicaprolactone polyols. Examples of commercially available polyesters that can be used are "Desmophens" from Bayer Corp. such as "Desmophen" 1652, 1700 and R12A. "Tone" polyols from Union Carbide that are caprolactone polyesters can be used.

Typical polyether polyols that can be used to form the coating composition used in the process of this invention are polyether polyols of a diol and a polyether glycol such as "Terathane" which is the polyether polyol of 1,4 butane diol and a polyether glycol. Polypropylene ether polyols also can be used.

Typical polyurethane polyols that can be used to form the coating composition used in the process of this invention are any of the aforementioned, acrylic polyols, polyester polyols or polyether polyols that are reacted with a polyisocyanate using a sufficient amount of polyol to form a hydroxy terminated polyurethane polyol. Any of the following polyisocyanates used to form the coating composition can be used for form the above polyurethane polyols.

The coating composition used in the process of this invention contains an organic polyisocyanate crosslinking agent. Any of the conventional aromatic, aliphatic, cycloaliphatic isocyanates, trifunctional isocyanates and isocyanate functional adducts of polyols and diisocyanates can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,5-toluene triisocyanate and the like. Oligomers of diisocyanates also can be used such as the trimer of hexamethylene diisocyanate which is sold under the tradename "Desmodur" N-3390.

Isocyanate functional adducts can be used that are formed from an organic polyisocyanate and a polyol. Any of the aforementioned polyisocyanates can be used with a polyol to form an adduct. Polyols such as 1,4 butane diol, trimethylol alkanes like trimethylol propane can be used. One useful adduct is the reaction product of tetramethylxylidine diisocyanate and trimethylol propane and is sold under the tradename "Cythane" 3160.

A fluorinated polyisocyanate also can be used which is the reaction product of an organic polyisocyanate and a fluorinated monofunctional alcohol represented by the formula

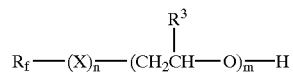

where $R_f$ is as defined above, a fluoroalkyl containing group having at least 4 carbon atoms and preferably a straight chain or branched chain fluoroalkyl group having 4–20 carbon atoms which optionally can contain oxygen atoms as ether groups or can contain 1–5 chlorine atoms or 1–5 hydrogen atoms. Preferably, $R_f$ is a perfluoroalkyl group having 4–20 carbon atoms and most preferably, $R_f$ is a perfluoroalkyl group containing 6–12 carbon atoms. X is a divalent radical, preferably —$CH_2CH_2O$—, —$SO_2N(R^4)$ $CH_2CH_2O$—, —$CH_2$—, —O—, —$CH_2O$— where $R^4$ is an alkyl group preferably having 1–4 carbon atoms. $R^3$ is H or an alkyl group having 1–4 carbon atoms, H and methyl being preferred, n is 0–1 and m is 0–30, provided that if n is 0, then m must be greater than or equal to 1, if m is 0, then n is 1, if X is —O—, m must be greater than or equal to 1; and m preferably is 1–20.

The following are preferred fluorinated monofunctional alcohols:

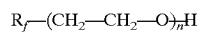

where $R_f$ is a perfluoroalkyl group having 6–12 carbon atoms and n is 5–15;

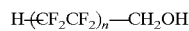

where n is 1–6;

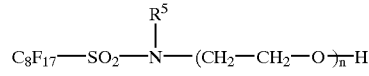

where $R^5$ is an alkyl group having 1–4 carbon atoms and n is 1–30;

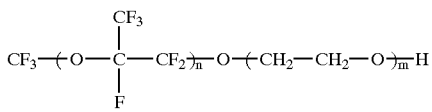

where n is 0–10 and m is 1–20; and

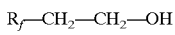

where $R_f$ is described above.

The fluorinated organic polyisocyanate is prepared by conventional techniques in which the fluorinated monofunctional alcohol and organic polyisocyanate are charged into a reaction vessel optionally with solvents and a catalyst for about 0.1–4 hours and heated to about 50–120° C. preferably, 60–85° C.

About 0.1–33 mole percent of active isocyanate groups of the organic polyisocyanate are reacted with the fluorinated monofunctional alcohol which leaves sufficient amount of unreacted isocyanate groups to react with functional groups of other components of a composition to form a crosslinked composition on curing. Preferably, about 0.1–10 mole percent of active isocyanate groups are reacted with the fluorinated monofunctional alcohol to provide a less costly fluorinated organic polyisocyanate which can be used with other film forming polymeric components having groups that are reactive with isocyanates to form crosslinked compositions.

When the coating composition used in the process of this invention is pigmented, it contains pigments in a pigment to binder ratio of 0.1/100 to 200/100. Typical pigments that are used are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, quinacridones, diketo pyrrolopyrrol, carbazoles such as carbazole violet, isoindolinones, isoindolones, thioindigo reds, benzimilazolinones and the like.

Typically, these pigments are dispersed with a dispersing resin by using conventional dispersing techniques and the resulting pigment dispersion is added and mixed with the coating composition used in the process of this invention.

If the coating composition used in the process of this invention is used as a clear coating composition or as a monocoat, weatherability of the coating composition is significantly improved by adding about 0.1–10% by weight, based on the weight of the binder, of ultraviolet light stabilizers, screeners, quenchers and antioxidants usually are added. Typical ultraviolet light screeners and stabilizers include the following:

Benzophenones such as hydroxy dodecyl oxy benzophenone, 2,4-dihydroxy benzophenone, hydroxy benzophenones containing sulfonic acid groups and the like.
Benzoates such as dibenzoate of diphenylol propane, tertiary butyl benzoate of diphenylol propane and the like.
Triazines such as 3,5-dialkyl-4-hydroxy phenyl derivatives of triazine, sulfur containing derivatives of dialkyl-4-hydroxy phenyl triazine, hydroxy phenyl-1,3,5-triazine and the like.
Triazoles such as 2-phenyl-4-(2,2'-dihydroxybenzoyl)-triazole, substituted benzotriazoles such as hydroxyphenyltriazole and the like.
Hindered amines such as bis(1,2,2,6,6 pentamethyl-4-piperidinyl sebacate), di[4(2,2,6,6,tetramethyl piperidinyl)] sebacate and the like and any mixtures of any of the above.

The coating composition can contain a sufficient amount of a catalyst to rapidly cure the composition at ambient temperatures. Generally, about 0.01–2% by weight, based on the weight of the binder, of catalyst is used. Typically useful catalysts are triethylene diamine and alkyl tin laurates such as dibutyl tin dilaurate, dibutyl tin diacetate, tertiary amines and the like. Preferred is dibutyl tin dilaurate.

Generally, flow control agents are used in the composition in amounts of about 0.1–5% by weight, based on the weight of the binder, such as polyacrylic acid, polyalkylacrylates, polyether modified dimethyl polysiloxane copolymers and polyester modified polydimethyl siloxane.

A clear coating composition is usually used over a plastic substrate that has the desired color or it can be used over a pigmented base coat. It may be desirable to use pigments in the coating composition, which have the same refractive index as the dried coating to provide a low gloss or flat finish. Typically useful pigments have a particle size of about 0.015–50 microns and are used in a pigment to binder weight ratio of about 1:100 to 40:100 and are inorganic siliceous pigments such as silica pigment having a refractive index of about 1.4–1.6.

The following examples illustrate the invention. All parts and percentages are on a weight basis unless otherwise specified. Molecular weight was determined by gel permeation chromatography using polystyrene as the standard.

EXAMPLE 1

| | Parts by Weight |
|---|---|
| Paint Composition 1 was prepared by mixing together the following constituents: | |
| Tertiary butyl acetate | 38.00 |
| N-propoxy propanol | 4.86 |
| Polycaprolactone diol | 25.59 |
| Synthetic amorphous silica, wax treated surface | 13.62 |
| 2(2'hydroxy-3,5'ditertiary-amylphenyl)benzotriazol | 0.56 |
| Linear hydroxy terminated polyester resin (polyester of 1,4 butane diol, adipic acid and ethylene glycol having a hydroxyl no. of 56) | 6.20 |
| Dibutyl tin dilaurate | 0.46 |
| Hindered amine light stabilizer (Tinuvin ® 292) | 0.64 |
| Imron ® High Solids White Tint (77.5% solids of titanium dioxide pigment predispersed in a low molecular weight acrylic resin having a pigment to binder ratio of 337/100) | 7.18 |
| Imron ® High Solids Black Tint (48.8% solids of furnace carbon black pigment predispersed in a low molecular weight acrylic resin having a pigment to binder ration of 9/100) | 2.86 |
| Imron ® High Solids Orange Tint (66.4% solids of iron oxide pigment predispersed in a low molecular weight acrylic resin having a pigment to binder ratio of 207/100) | 0.03 |
| Total | 100.00 |
| An activator solution 1 was prepared by blending together the following constituents: | |
| "Desmodur" N 3300 (100% solids of polyisocyanate trimer of hexamethylene diisocyanate) | 70.00 |
| Tertiary butyl acetate | 30.00 |
| Total | 100.00 |

Four parts of the above Paint Composition 1 were blended with one part of the activator solution 1 to form Coating Composition 1, which was sprayed onto the following substrates to a dry film thickness of 25 microns. The coating was allowed to dry for 10 minutes at ambient temperature and then baked of 30 minutes at 70° C. and then the appearance of each was noted and shown in the table below.

| Substrate Type | Defects in Substrate | Appearance after Coating and Drying |
|---|---|---|
| ABS | Splay marks from heat and moisture and surface blushing | Smooth even coating with no substrate defects visible |
| ABS/Polycarbonate | Surface blushing and splay marks from mold | Smooth even coating with no substrate defects visible |
| Polycarbonate reinforced with 10% by weight fiberglass | Low gloss, surface blushing and splay marks from mold | Low gloss, smooth and even coating with no substrate defects visible |

The following coating compositions were prepared and tested as above on the above substrates:

Coating Composition 2—all of the tertiary butyl acetate in the paint composition and the activator solution was replaced with n-butyl acetate.

Coating Composition 3—all of the tertiary butyl acetate solvent in the paint composition and the activator solution was replaced with isobutyl acetate For each of the substrates shown above neither Coating Composition 2 or 3 hid the surface defects of the substrates. The surface defects were visible to the naked eye. The isomers of tertiary butyl acetate, n-butyl acetate and isobutyl acetate are aggressive solvents that do not allow hiding of surface defects of the above thermoplastic substrates when formulated into coating compositions.

The following coating compositions A–M were prepared as above by substituting the solvent shown for the tertiary butyl acetate in the paint composition and the activator solution:

| Coating Composition | Solvent |
|---|---|
| A | Methyl amyl ketone |
| B | Ethyl acetate |
| C | Acetone |
| D | 1,4 Pentanedione |
| E | Methyl ethyl ketone |
| F | Methyl propyl ketone |
| G | Diisobutyl ketone |
| H | Propyl acetate |
| I | Hexyl acetate |
| J | Propyl propionate |
| K | Methyl butyrate |
| L | Xylene |
| M | Toluene |

Each of the above-formulated Coating Compositions A–L were applied to the above substrates and cured as above. None of the coating compositions hid the defects of the substrates as did Coating Composition 1 that was formulated with tertiary butyl acetate.

EXAMPLE 2

Coating Composition 4 was prepared which is identical to Coating Composition 1 with the exception that the white, black and orange tints were omitted from the composition thereby providing a non-pigmented clear coating composition. This composition was sprayed onto the three substrates described in Example 1 and cured as in Example 1 and examined. In each case, a low gloss clear coating was produced and the surface defects of the substrates were not visible on the surface of the coating.

EXAMPLE 3

A Fluorinated Polyisocyanate Solution I was prepared by mixing the following constituents in a reaction vessel equipped with a mechanical stirrer, condenser, nitrogen inlet and a thermocouple:

|  | Parts by Weight |
|---|---|
| Portion 1 | |
| Polyisocyanate solution (98.9% solids trimer of hexamethylene diisocyanate) | 3000.00 |
| Butyl acetate | 275.00 |
| Ethyl acetate | 550.00 |
| Ethylene glycol monobutyl ether acetate | 175.00 |
| Portion 2 | |
| Fluoroalkyl alcohol $F(CF_2)_nCH_2CH_2O(CH_2CH_2O)_mH$ where n is an average of 6 and m is an average of 7.5 | 27.20 |
| Di-n-butyl tin dilaurate solution (2% solids in ethyl acetate) | 0.50 |
| Total | 4027.70 |

Portions 1 and 2 were each added to the reaction vessel under a positive pressure of nitrogen and heated to about 75–80° C. and held at this temperature for about 2 hours and allowed to cool overnight. The resulting Fluorinated Polyisocyanate Solution I contained about 1% of the fluorinated component.

Coating Composition 5 was prepared by blending 4 parts of the Paint Composition of Example 1 with 1 part of the above using the above Fluorinated Polyisocyanate Solution I. Coating Composition 5 was sprayed onto the substrates described in Example 1 and dried and cured as in Example 1 and the appearance of each substrate was viewed. Even though Coating Composition 5 contained some aggressive solvents, there was a sufficient amount of tertiary butyl acetate present so that the surface defects in each of the substrates were not visible

EXAMPLE 4

A lacquer type of Coating Composition 6 was prepared by blending together the following constituents: 69.5 parts tertiary butyl acetate, 20 parts acrylic polymer solution (50% solids in a blend of ethyl acetate/butyl acetate solvent of a polymer of butyl acrylate/acrylic acid/acetoacetoxy ethyl methacrylate, weight ratio 70/10/20), 7.18 parts of the white tint (described in Example 1), 2.86 parts of the black tint (described in Example 1) and 0.03 parts of the yellow tint (described in Example 1). The resulting coating composition was sprayed onto the three substrates shown in Example 1 and cured according to the procedure of Example 1. In each case, the cured coating on the substrate was smooth even and glossy with no defects of the substrate visible.

What is claimed is:

1. A process for coating a colored thermoplastic substrate having a surface with splay marks and surface blushing which comprises applying a solvent based coating composition to the substrate and curing the coating composition at ambient temperature to 125° C. to form a uniform smooth film of a degree sufficient to hide underlying said splay marks and surface blushing on the substrate;

wherein the coating composition comprises about 45–80% by weight of a film forming binder and 20–55% by weight of an organic liquid carrier; wherein the binder consists essentially of (A) 40–90% by weight, based on the weight of the binder, of a chlorinated polyolefin-free polymer selected from the group consisting of:
an acrylic polyol comprising polymerized monomers of alkyl (meth) acrylates and hydroxy alkyl (meth) acrylates having a weight average molecular weight of 2,000–20,000, polyester polyol, polyether polyol or a polyurethane polyol; and
(B) 10–60% by weight, based on the weight of the binder, of an organic polyisocyanate crosslinking agent selected from the group consisting of aromatic polyisocyanates, aliphatic polyisocyanates and cycloaliphatic polyisocyanates; and
wherein the organic liquid carrier used in the coating composition consists of at least 50% by weight, based on the weight of the organic liquid carrier used in the coating composition, of tertiary butyl acetate and up to 50% by weight, based on the weight of the organic liquid carrier, of other compatible organic solvents.

2. The process of claim 1 in which the organic liquid carrier consists of 75–90% by weight, based on the weight of organic liquid carrier used in the composition, of tertiary butyl acetate and 10–25% by weight of other compatible organic solvents.

3. The process of claim 1, wherein the organic polyisocyanate is a fluorinated polyisocyanate of an organic polyisocyanate reacted with a perfluoroalcohol represented by the formula

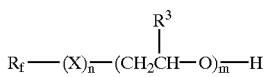

where $R_f$ is a fluoroalkyl containing group having at least 4 carbon atoms, X is a divalent radical, $R^3$ is H or an alkyl group having 1–4 carbon atoms, n is 0–1 and m is 0–30 provided that when n is 0 then m must be equal to or greater than 1 and when m is 0 then n is 1;
wherein about 0.1–33 mole percent of active isocyanate groups are reacted with the fluorinated monofunctional alcohol.

4. The process of claim 3 in which $R_f$ is a fluoroalkyl containing group having 4–20 carbon atoms, X is selected from the group consisting of —CH$_2$CH$_2$O—, —SO$_2$N(R$^4$)CH$_2$CH$_2$O—, —CH$_2$—, —O—, —CH$_2$O—; $R^4$ is an alkyl group having 1–4 carbon atom; $R^3$ is H or methyl and m is 1–20.

5. The process of claim 1 in which the binder is a polyurethane polyol.

6. A process for coating a colored thermoplastic substrate having a surface with splay marks and surface blushing which comprises applying a solvent based coating composition to the substrate and curing the coating composition at ambient temperature to 125° C. to form a uniform smooth film of a degree sufficient to hide underlying said splay marks and surface blushing on the substrate;

wherein the coating composition comprises about 45–80% by weight of a film forming binder and 20–55% by weight of an organic liquid carrier; wherein the binder consists essentially of
(A) 40–90% by weight, based on the weight of the binder, of a chlorinated polyolefin-free polymer selected from the group consisting of:
an acrylic polyol comprising polymerized monomers of alkyl (meth)acrylates and hydroxy alkyl (meth) acrylates having a weight average molecular weight of 2,000–20,000, polyester polyol, polyether polyol or a polyurethane polyol; and
(B) 10–60% by weight, based on the weight of the binder, of an organic polyisocyanate crosslinking agent selected from the group consisting of aromatic polyisocyanates, aliphatic polyisocyanates and cycloaliphatic polyisocyanates; wherein the organic polyisocyanate is a fluorinated polyisocyanate of an organic polyisocyanate reacted with a perfluoroalcohol represented by the formula

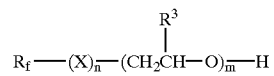

where $R_f$ is a fluoroalkyl containing group having at least 4 carbon atoms, X is a divalent radical, $R^3$ is H or an alkyl group having 1–4 carbon atoms, n is 0–1 and m is 0–30 provided that when n is 0 then m must be equal to or greater than 1 and when m is 0 then n is 1;
wherein about 0.1–33 mole percent of active isocyanate groups are reacted with the fluorinated monofunctional alcohol; and
wherein the organic liquid carrier used in the coating composition consists of at least 50% by weight, based on the weight of the organic liquid carrier used in the coating composition, of tertiary butyl acetate and up to 50% by weight, based on the weight of the organic liquid carrier, of other compatible organic solvents.

* * * * *